Sept. 10, 1935.  H. D. COLMAN  2,013,649
CLUTCH
Original Filed Jan. 25, 1930   2 Sheets-Sheet 1

INVENTOR
Howard D. Colman
BY
ATTORNEYS

Sept. 10, 1935.     H. D. COLMAN     2,013,649
CLUTCH
Original Filed Jan. 25, 1930    2 Sheets-Sheet 2

INVENTOR
Howard D. Colman
BY
ATTORNEYS

Patented Sept. 10, 1935

2,013,649

UNITED STATES PATENT OFFICE 2,013,649

CLUTCH

Howard D. Colman, Rockford, Ill.

Application January 25, 1930, Serial No. 423,310
Renewed November 28, 1934

47 Claims. (Cl. 192—149)

This invention relates to clutches and more particularly to those of the positive drive type.

The primary object of the present invention is to provide a positively acting clutch which is adapted for high speed operation and accurate timing of the movements of the parts driven thereby, first by reason of the light weight and low moment of inertia of its driven parts resulting from the advantageous manner in which they are grouped closely adjacent their rotational axis, and second through the use of a novel means for controlling the actuation of an element by which connection and disconnection of the driving and driven clutch members are effected.

Another object is to provide a new and improved arrangement of bumpers for quickly arresting the motion of the driven clutch parts in one or more accurately defined positions following disengagement of the clutch.

Still another object is to provide a novel means for cushioning the shock incident to sudden stopping of the driven parts and also the impact of the resulting rebound.

A further object is to provide a novel means for relieving frictional resistance between two cooperating parts so as to facilitate relative movement between the parts by extremely delicate instrumentalities such as high speed electromagnets.

The invention also aims to provide novel means acting while the clutch is engaged to prevent disengagement of the clutch parts or variance in their angular relationship under the shock incident to sudden engagement of the clutch.

Other objects and advantages of the invention will become apparent from the following detailed description taken in connection with the acompanying drawings, in which.

In the exemplary embodiment shown in the drawings, the clutch is utilized to connect a driving shaft in the form of a sleeve 10 with a driven shaft 11 journalled in the sleeve. The sleeve is rotatable in a supporting bearing 12 and carries a gear 13 driven from the source of power. The driving member of the clutch is fast upon the other end of the sleeve and comprises, in the present instance, a disk 14 having one or more peripheral teeth depressions 15 with abrupt shoulders 16 which are disposed in substantially radial positions and define the trailing side edges of pockets 17 in the external periphery of the disk. The disk is intended to be driven in the direction indicated by the arrows in the different figures so that the shoulders 16 move broadside in a circular path.

Connection and disconnection of the driving and driven clutch members is effected through the medium of a connecting element held against circumferential movement relative to the driven member and mounted thereon for movement in opposite directions into and out of the path traversed by the shoulders 16. In the present instance, the element is in the form of an L-shaped bolt generally designated 18 extending in a substantially radial direction and arranged for endwise movement.

Figure 3:
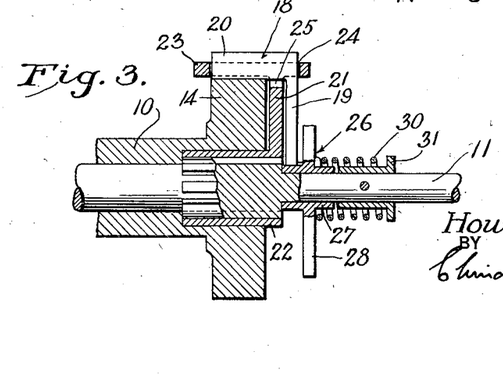
Fig. 3 is a fragmentary sectional view taken substantially along a vertical plane including the axis of the clutch shown in Fig. 1.
Figures 4, 5, 6:
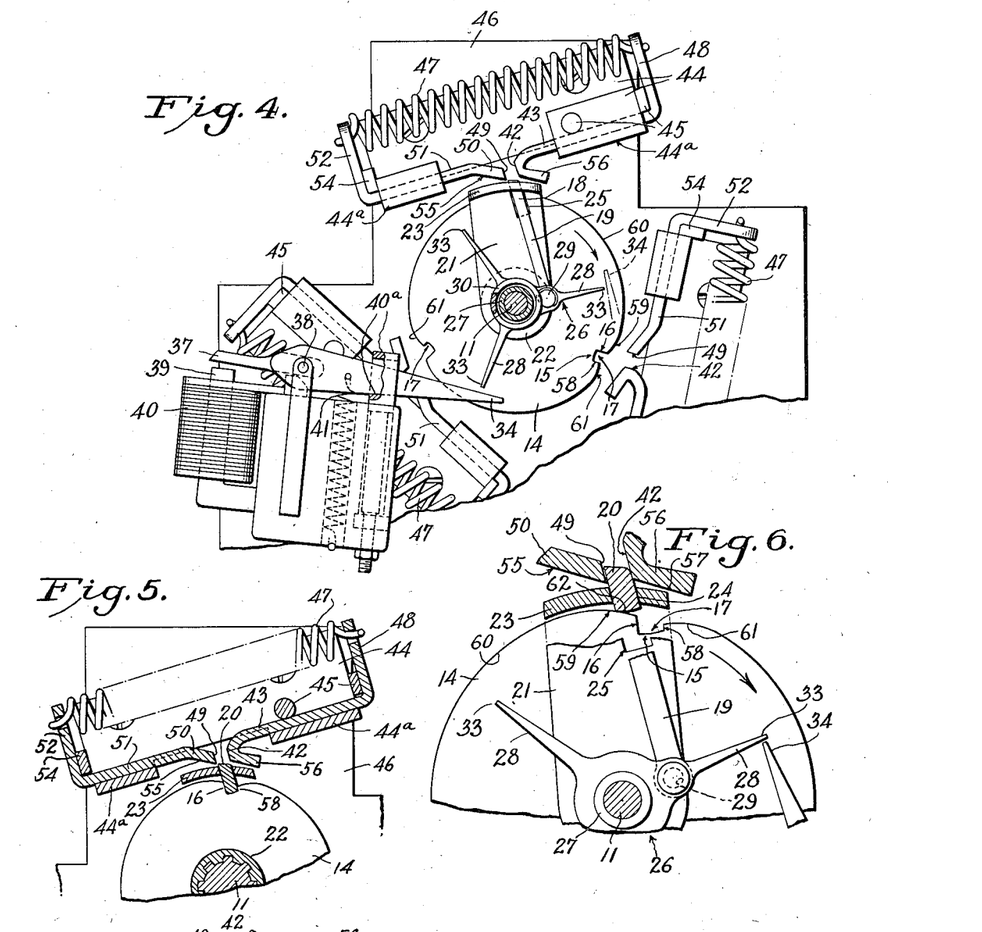
Fig. 4 is a sectional view taken along the line 4—4 of Fig. 2 showing the clutch engaged and arranged for control by electromagnetic means.
Fig. 5 is a fragmentary sectional view taken along the line 5—5 of Fig. 2.
Fig. 6 is a fragmentary view similar to Fig. 4 with certain of the parts in section showing their relation shortly after disengagement of the clutch.

As best shown in Figs. 3 and 4 the bolt has an elongated shank 19 spaced axially from the disk 14 and slightly inclined relative to a truly radial position so that the shank may be substantially straight with its inner end projected to or beyond the driven shaft axis. Rigid with the outer end of the shank 19 is a substantially flat arm 20 which projects laterally from the shank in a direction perpendicular thereto so as to overlie the periphery of the disk and provide a large area for engagement with the shoulders 16. The inner edge portion of the arm 20 is thus adapted, by endwise movement of the bolt as a whole, to move into and out of the path of the shoulders 16 and thereby become engaged with or disengaged from the teeth of the driving disk.

Means is provided for guiding the bolt in its bodily endwise movement and forming a lateral support of relatively small mass and yet sufficiently rugged to sustain the blows applied to the bolt as an incident to the engagement and disengagement of the clutch. This means includes in the present instance a substantially flat radial arm 21 located between the disk 14 and the bolt shank 19 and formed integral with a hub 22 which is splined or otherwise fixedly secured to the shaft 11 preferably within the disk 14.

Rigid with the outer end of the arm 21 and overlying the disk is a curved plate 23 having a closed slot 24 defining a guideway for the bolt arm 20 and acting to hold the bolt against circumferential movement relative to the driven member. As shown in Fig. 6, the plate 23 is concentric with the shaft 11 and is spaced radially therefrom just beyond the outermost point on the periphery of the driving disk 14 so that the arm 20 and the bolt as a whole are firmly supported against lateral displacement when in either its inner clutch-engaged position (Fig. 5) or in its outer disengaged position (Fig. 6). The arm 21 is slotted as indicated at 25 to permit the required inward movement of the bolt arm 20.

The bolt 18 is arranged to be actuated by a part mounted on the driven clutch member for rotation therewith and for limited circumferential or angular movement relative thereto. Preferably, said part is in the form of a lever, indicated generally by the numeral 26, and is fulcrumed upon the axis of the driven clutch member. The lever comprises a hub 27 loosely mounted on the shaft 11 adjacent the supporting arm 21 and one or more elongated and substantially straight fingers 28 rigid with the hub and extending radially a substantial distance from the driven shaft 11. Thus the outer ends of the fingers traverse a circular path of relatively large diameter, and concentric with the clutch axis, being in the present instance substantially equal in diameter to the path described by the shoulders 16.

Relative circumferential movement between the lever 26 and the driven member is utilized for moving or controlling the actuation of the bolt 18 to cause engagement and disengagement of the clutch. While the actuating force may be transmitted from the lever to the bolt in various ways, I have, for the sake of simplicity and lightness of construction, chosen to employ a direct pivotal connection. Thus, the inner end of the bolt shank 19 is joined by a pivot pin 29 to an enlarged portion of one finger 28 close to the hub 27. The positive two-way connection thus formed between the finger and the bolt shank provides a rugged lateral support for the inner end of the bolt and cooperates with the plate 23 to hold the bolt securely against displacement under the impact resulting from the engagement of the bolt and one of the shoulders 16. Since the lever arm between the pivot pin 29 and the lever fulcrum extends in a direction substantially perpendicular to the bolt shank 19, it will be apparent that any lateral thrust on the inner end of the bolt will act substantially through said fulcrum and will not have a tendency to swing the control fingers 28 relative to the driven member.

With the arrangement above described, it will be observed that angular movement of the lever 26 in a counter-clockwise direction relative to the shaft 11 as viewed in Fig. 4, will cause the bolt to be shifted outwardly, while reverse movement of the finger will draw the bolt arm 20 inwardly to clutch-engaging position and thereby connect the driving and driven clutch members.

Figure 2:
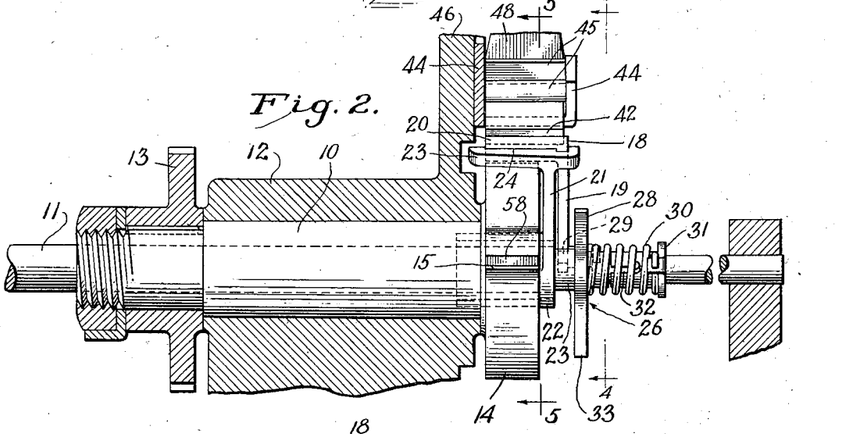
Fig. 2 is a side elevational view of the clutch shown in Fig. 1 with certain of the supporting parts shown in section.

The bolt is constantly urged toward its inner position thereby tending to engage the clutch. This is accomplished, in the present instance, by a spring 30 coiled about the shaft 11 and acting in torsion to swing the lever 26 in a clockwise direction (as herein shown) relative to the shaft. One end of the spring is attached to the pin 29 while the other is secured to a sleeve 31 fixed on the shaft 11 through the medium of a bayonet slot connection 32 (Fig. 2) which permits adjustment of the spring tension.

Energy for moving the bolt outwardly against the action of the spring 30 to disengage the clutch is derived from the motion of the rotating driven member. For this purpose, one or more stops 10 are mounted on stationary supports for movement into and out of the circular path traversed by the tips 33 of the fingers 28. When a tip 33 is blocked, the lever 26 is restrained against further movement so that the continued rotation of the driven parts through a given angle will cause relative circumferential movement between the lever 26 and the driven member which is sufficient to cause withdrawal of the bolt from engagement with the path of the shoulders 16, such withdrawal taking place against the action of the spring 30.

Figure 1:
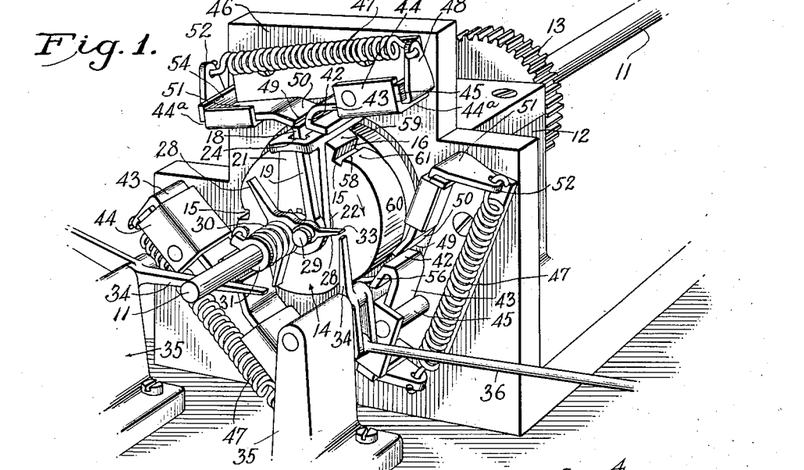
Figure 1 is a perspective view of a clutch embodying the novel features of the present invention.

In the embodiment shown in Fig. 1, there are two stops in the form of detents 34 each pivotally supported by a relatively stationary bearing 35 to swing about an axis which is so located that the force applied by the finger 28 upon striking the detent will act through said axis. The force of such impact places the detent under endwise compression and is sustained by the detent bearings without tending to swing the detent in either direction. The detent may be moved into and out of blocking position (Fig. 1) by actuation of an endwise movable rod 36.

The extent of angular movement of the lever 26 required to disengage the clutch after a tip 33 contacts a detent 34 depends, of course, on the radial width of the shoulders 16 and the mechanical advantage with which the lever 26 works. However, inasmuch as this angular movement is fixed for any given clutch, disengagement of the clutch at any desired point in a revolution of its driven member may be obtained by proper location of a control detent 34.

By reason of the fact that the fingers 28 are fulcrumed on the rotational axis of the shaft 11, it will be apparent that the tips 33 remain equidistant from the shaft axis regardless of their angular position relative to the shaft. For this reason, only a slight movement of the control detent is required to block or release the finger and thereby control the engagement or disengagement of the clutch. Furthermore, it will be observed that the shock incident to engagement of the clutch is applied transversely of the bolt 18 and sustained by the bolt guides rather than by the controlling detent. Thus the only forces which the control detent 34 is called upon to overcome are the effect of the spring 30 and friction and inertia of the parts. In overcoming these forces, the detent acts with large mechanical advantage owing to the spacing of the tips 33 and pivot pin 29 relative to the fulcrum of the lever 26.

For the foregoing reasons, it will be apparent that the detent 34 for controlling the present clutch may be of very light construction and moved readily through the required distance by a force of extremely small magnitude. It follows, therefore, that the clutch is particularly suited for control by delicate and sensitive instrumentalities such as high speed electromagnets. Such a control is shown in Fig. 4 wherein the detent 34 is rigid with a magnetic armature 37 pivoted at 38 near one pole projection of a U-shaped magnetic core 39 around which is wound an energizing coil 40. The armature is adapted to move back and forth a minute distance determined by stops 40ª to carry the tip of the associated detent 34 into and out of the path of the finger tips 33. In the present instance, movement of the detent out of said path is produced by a spring 41 acting on the detent which thereby causes engagement of the clutch. Disengagement of the clutch is effected by energization of the magnet coil 40 which attracts the armature and moves the detent into blocking position.

Upon disengagement of the clutch, the rotary motion of the driven parts is quickly arrested with the shaft 11 in an accurately defined position and without unduly straining any of the parts. To this end, an abutment mounted on a stationary support is positioned for engagement with an element which rotates with the driven parts of the clutch and moves into and out of position to engage said abutment as incidents to the disengagement and engagement of the clutch respectively. In the present instance, the bolt arm 20 constitutes such an element and is therefore utilized in arresting the motion of the driven parts in addition to performing the clutching functions above described.

The abutment above referred to is defined by the radially disposed end surface 42 of a bumper bar 43 mounted between stationary flanges 44 of a guide plate 44ª for endwise movement in a direction substantially perpendicular to the bolt arm when the latter is engaging the bumper. The bar 43 is guided for endwise movement only along the plate 44ª by bars 45 rigidly connecting the flanges 44, which latter are rigid with a stationary support 46.

The bumper unit thus formed is mounted in such radial position that the abutting surface 42 is disposed in the path of the outer edge portion of the bolt arm 20 when the latter is projected outwardly beyond the plate 23 as will be the case when the clutch is disengaged. The circumferential position of the abutment 42 is such that it will be struck by the bolt arm 20 simultaneously with or just prior to the disengagement of the bolt arm 20 and the shoulder 16 by the blocking action of one of the detents 34 on one of the fingers 23.

The bumper is very effective in its stopping action owing to the fact that it acts on a part disposed a substantial distance from the clutch axis. In order to cushion the shock of stopping the driven parts, the abutment 42 is arranged to yield in the direction of rotation of the driving disk. This yielding takes place against the initial tension of a contractile spring 47 which has one end connected to an end flange 48 on the bumper bar 43 and normally urges the bar against a stop formed by one of the cross bars 45. Yielding of the abutment while the energy of stopping is being dissipated allows the driven parts to move slightly beyond the stopped position determined by the normal circumferential position of the abutment 42, but the spring 47 is of sufficient strength to restore the driven parts to such stopped position. The location of the abutment 42 so that it is engaged by the bolt arm 20 simultaneously with or subsequent to disengagement of the clutch insures that the bolt will be maintained out of the path of the driving shoulders 16 by the action of the control detent 34 so long as the clutch remains disengaged. Otherwise the detent would not hold the bolt arm 20 in position to clear the shoulders 16 after the driven parts have been restored to their stopped position under the action of the spring 47.

It will be observed that the force of stopping is applied to the bolt 19 transversely of its length and is thus transmitted to the more rugged supporting arm 21 without burdening the more delicate control parts including the fingers 29 and the detents 34. In the engagement of the clutch, the stopping bumper is rendered ineffectual automatically since it coacts with a part of the bolt which is retracted inwardly in order to cause such engagement of the clutch.

To prevent backward movement of the driven clutch parts beyond the position determined by the bumper 43 and at the same time absorb the shock of the rebound produced by the spring 47 in restoring the driven parts to the position predetermined by the normal position of the bumper, an abutment 49 is positioned opposite the bumper surface 42 and spaced therefrom a distance corresponding to the thickness of the bolt arm 20 so as to form a sliding fit. This abutment is also yieldable and is formed by the end surface of an inclined projection 50 on a bar 51 slidable in the guide plate 44ª for endwise movement in a direction perpendicular to the trailing side surface of the bolt arm 20 when the latter is engaging the bumper 43. The bar 51 is mounted in a manner similar to the bar 43.

Yielding of the bar 51 when struck by the rebounding bolt arm 20 takes place against the action of the spring 47 which is attached to a flange 52 on the bar 51 and therefore connects the two bumper bars 43 and 51. Thus the spring normally draws the bar 51 into the position shown in Fig. 5 which is determined by a stop bar 54. The latter provides a fulcrum about which the end 50 of the bar 51 may be swung by the bolt arm 20 acting as a cam on the surface 55 as the clutch becomes disengaged and the bolt arm 20 approaches the stopping bumper 43. When the trailing edge of the bolt arm has passed the end of the surface 55, the spring 47 swings the bar 51 to normal position against the guide plate 44ª thereby latching the driven parts against backward movement except by yielding of the bumper surface 49.

From Fig. 5, it will be apparent that the opposing abutments 42 and 49, coacting with the opposite side surfaces of the bolt arm 20, lock the driven parts in a predetermined position upon disengagement of the clutch and after dissipation of the energy of the driven parts. The position is accurately defined by reason of the fact that the abutments act on the driven parts at a considerable distance from the shaft axis. This result, together with the effectual dissipation of the kinetic energy of the driven parts, is attained without increasing the number or mass of the driven parts or of the parts which are required in order to control the engagement and disengagement of the clutch. The spring 47 being stretched between the two abutments serves to cushion the shocks of stopping and rebound and also produces the latching action of the bumper 51 which is mounted for pivotal as well as endwise movement.

In clutches wherein the driven parts are to be stopped at various points in a single revolution, a corresponding number of bumper units are required. Three of such units are shown in the present instance arranged in annularly spaced relation and each adapted to cooperate with the bolt arm 20 when the clutch is disengaged by blocking of a predetermined one of the fingers 28 by a certain control detent 34. Such simple construction and mounting of the bumpers and the use of a plurality thereof is made possible by the fact that they act at a point remote from the clutch axis on a part on the driven clutch member which moves automatically as incidents to engagement and disengagement of the clutch.

Figure 7:
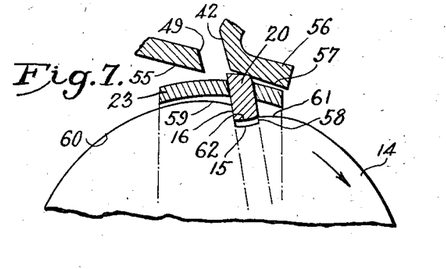
Fig. 7 is a view similar to Fig. 6 showing the relation of parts shortly after engagement of the clutch.

The shock of the sudden starting of the driven parts by engagement between a shoulder 16 and the bolt places the bolt and the supporting arm 21 under considerable stress. The elasticity of these parts under such stress tends to cause the bolt arm to rebound from the driving shoulder 16 and run ahead of the shoulder. To avoid such action, the stopping bumper 43 is formed with a backturned arm 56 whose inner inclined surface 57 is disposed in the path of the bolt arm 20 when the clutch is not fully engaged. As the driven parts move away from stopped position following engagement of the clutch (see Fig. 7), the surface 57 exerts, for part of a revolution, a cam action on the outermost edge of the bolt arm 20 which restrains the arm from running ahead of the proper driving shoulder 16. By the time the bolt arm has passed the end of the arm 56, the energy tending to cause rebounding will have been dissipated and the driven parts will rotate freely without contacting the cam surface 57 as long as the clutch is completely engaged.

Under certain circumstances, extraneous forces are applied to the parts driven by the clutch tending to cause the driven parts to run ahead of the driving disks, thereby destroying accurrate timing. To avoid this condition, the leading edge of each pocket 17 in the driving disk 14 is defined by a shoulder 58 spaced from the shoulder 16 a distance sufficient to provide a sliding fit with the bolt arm when the arm 20 is seated in a pocket 17 as shown in Fig. 5. The shoulder 58 acting through the medium of the bolt effectually locks the driven parts against running ahead of the driving disk.

When the width of the pocket 17 is not substantially greater than the thickness of the bolt arm 20, the shoulder 58 is made of considerably narrower radial width than the shoulder 16. Accordingly the surface of the disk immediately in advance of the pocket 17 is sloped inwardly as indicated at 61 to allow ample time for the bolt arm to move into the path of the shoulders 16 and also to moderate the entering movement of the bolt under the action of the relatively strong spring 39.

Preferably the shoulder 58 is located so close to the shoulder 16 that no play exists between the driving and driven members when the clutch is engaged. In the event that the bolt arm 20 rebounds from a shoulder 16 without engaging the shoulder 58, the cam surface 57 will become effective on the outer end of the bolt arm to restrain overrunning of the driven parts until the pocket 17 has caught up with the bolt arm. Then the surface cams the arm positively into the pocket behind the locking shoulder.

To permit the engagement of the clutch to be timed accurately and controlled by an extremely sensitive device such as a high speed electromagnet, means is provided for relieving the pressure between the active finger 28 and the control detent 34 so that the latter may be withdrawn without overcoming the frictional force produced between the finger and detent by the action of the spring 30. This means functions in timed relation to the driving clutch member and acts periodically, while the clutch is disengaged, to retract the lever 26 away from the blocking detent. Preferably this retracting force is derived from the driving clutch member and since the bolt 18 has a two-way connection with the lever 26, the bolt may be utilized as a means for transmitting the retracting force and applying the same to the lever. To this end, a cam surface is formed on the disk 14 between the notches 17, which surface is in this instance formed on the periphery of the disk and comprises a relatively short leading portion 59 immediately adjacent the shoulder 16, which terminates in a longer surface 60 whose trailing portion merges gradually into the entering slope 61.

Immediatly upon disengagement of the clutch, that is, when the bolt arm 20 passes beyond the outer edge of the shoulder 16, the surface 59 acts on the slightly curved inner edge 62 of the bolt arm 20 and cams the bolt outwardly as shown in Fig. 6, thereby moving the finger 28 backwardly away from the active control detent 34. This relieves the pressure at the tip of the control detent which may then be withdrawn without overcoming any forces other than its inertia and the friction at its bearings. If the detent is withdrawn, the bolt arm will follow along the surfaces 60 and 61 and finally drop into the next pocket 17 as the clutch becomes engaged. In case the detent is not withdrawn, the finger 28 is allowed to move back against the blocking detent as the cam surface 61 passes the bolt, the clutch thereby remaining disengaged as the next shoulder 16 moves past the bolt. Then the next surface 59 becomes effective to produce the relieving action. This action continues periodically until the control detent is drawn out of blocking position.

While the lever 26 is being moved rapidly toward and away from the control detent to relieve the pressure on the latter, the driven parts are held accurately in the stationary position predetermined by the position of the control detent. This function is performed by the stopping and rebound abutments 42 and 49 which form guideways coacting with the outer portion of the bolt arm 20 during the actuation of the latter by the relieving cams. It will, therefore, be apparent that while the relieving action is taking place, the driven parts are locked against angular movement in either direction by the action of the relieving cam, the spring 30, or extraneous forces applied to the driven parts.

It will be observed that the cam surfaces 59 and 60 controlling the relieving action above described occupy a relatively large part of the distance between the shoulders 16 so that ample time is allowed for insertion or withdrawal of a controlling detent even though the driving clutch member is rotated at high speed. Furthermore, by providing relatively long cam surfaces for effecting the relieving action, the rate of movement of the bolt and associated parts is reduced to a minimum, thus reducing the wear and tear thereon. Wear at the engaging surfaces of the control detents 34 and fingers 28, due to entry and withdrawal of the detents and an accompanying inaccuracy in the stopping positions controlled thereby, is effectually avoided through the provision for relief of the friction at the tips of the detents.

Frequently, it becomes necessary to make the engagement of the present clutch and starting of the driven parts from a given position dependent upon the concurrence of two or more conditions. This is accomplished easily with the present clutch by rendering a plurality of the detents 34 responsive individually to the different conditions and positioning such detents as shown in Fig. 4 so that both are adapted to arrest the motion of the driven parts in the same position. The relieving action above described facilitates this type of control in that it not only permits the control detents to be withdrawn by delicate instrumentalities but enables any one of the detents to be moved readily into blocking position by such instrumentalities while the clutch is held disengaged by another of the detents. For the same reason, any detent may be entered or withdrawn readily any number of times and the control of the clutch thus shifted from one sensitive control instrumentality to another without allowing the clutch to become engaged.

*Operation*

To explain more fully the timed relation in which the parts operate upon engagement and disengagement of the clutch above described, the operation of the clutch will be briefly summarized, it being first assumed that the clutch is engaged (see Figs. 4 and 5). The driving and driven clutch members are locked together and rotate in unison so long as none of the rotating fingers 18 is blocked. The bolt being in its inner position will pass the bumpers without engagement therewith.

Suppose now that a control detent 34 is swung inwardly into blocking position (Figs. 1 and 6). The tip 33 of the next finger 28 presented thereto will strike the tip of the detent about the time when the outer end of the bolt first comes opposite the surface 55 of the rebound bumper 50. The lever 26 is thus restrained against further movement but the bolt continues to rotate with the arm 21 and the other driven parts. Since the bolt is connected to the lever, such continued angular movement of the driven parts can take place only with an outward movement of the bolt, that is, in a direction to disengage the arm 20 from the driving disk. Before disengagement occurs the outer edge of the arm 20 acting on the surface 55 cams the plate 50 out of its path. Owing to the length and slenderness of the fingers 28, the latter possess considerable resiliency which serves to cushion the impact under which the engaging parts of the finger tip and detent are placed in the disengagement of the clutch. Such cushioning effectually reduces wear and tear on the engaging parts and greatly prolongs the life of the clutch.

In the continued advance of the driven parts, the bolt arm 20 continues to move outwardly beyond the supporting plate 23, actual disengagement taking place when the inner edge of the arm passes the outer edge of the shoulder 16. This occurs just as or slightly prior to the time when the outermost trailing surface of the bolt arm 20 passes the abutment 49 which thereby allows the plate 50 to move in behind the bolt.

As an incident to disengagement of the clutch, the bolt arm 20 is moved into a position to strike the abutment 42 which occurs substantially simultaneously with or slightly after the disengagement of the bolt from the driving disk. The spring 47 then becomes effective through the medium of the bolt and arm 21 to yieldably resist continued movement of the driven parts. When their kinetic energy has been absorbed by the spring, the energy stored therein is imparted to the driven parts and moves them reversely. In thus rebounding, the bolt arm 20 strikes the abutment 49 and the bumper plate 51 yields and extends the opposite end of the spring 47 while the rebound energy is being absorbed. The driven parts continue to vibrate between the two bumpers at decreasing amplitudes until their kinetic energy has been dissipated completely. The bumpers then act to hold the parts in an accurately defined position (Fig. 1) thereby overcoming any tendency of the spring 30 to rotate the driven parts reversely to such an extent as to allow the bolt arm to move into the path of the driving shoulders 16.

Immediately upon disengagement of the clutch, the cam surface 59 becomes effective to relieve the pressure between the finger 28 and the detent tip by retracting the lever 26 as indicated in Fig. 6. This action continues periodically as the cam surfaces between successive driving shoulders are presented to the bolt arm. The trailing portion of the cam surface 60 and the surface 61 allow the spring 30 to move the lever back against the detent tip while each notch 17 passes the bolt.

While the lever 26 is retracted away from the detent tip, the detent may be withdrawn readily or another moved into blocking position. When all detents are withdrawn during a relieving motion of the bolt, so as to clear the fingers 28, the bolt arm 20 follows along the next trailing surface 61 which allows the bolt to move inwardly under the action of the spring 30 into the path of the shoulder 16. In this movement, the outer edge portion of the bolt arm is withdrawn from engagement with the abutment 42 and the inner edge is projected into the path of the driving shoulders 16, the next one of which to be presented to the bolt strikes the arm 20 and initiates the movement of the driven parts. In the initial part of this movement, the surface 57 acts as a cam on the outer edge of the bolt arm to prevent the driven parts from running ahead of the driver and to force the same into the pocket 17 behind the locking shoulder 58.

It will be apparent that the clutch above described possesses all of the principal advantages of a clutch of the jaw type, namely, the provision of a positive connection between the driving and driven clutch members which insures the maintenance of a predetermined angular relationship between the driving and driven parts when the clutch is engaged and enables the engagement and disengagement to be timed accurately. At the same time, the driving and driven parts may be operated at such high speed as has heretofore been obtainable only in clutches of the friction type. The clutch is particularly suited for high speed operation because of the low moment of inertia of the driven parts resulting from the concentration of their masses close to the rotational axis of the clutch and the further fact that the forces incident to engagement and disengagement are applied in such an advantageous manner that the driven and control parts may be made exceedingly light in construction.

In addition to the performance of its normal function of controlling the engagement and disengagement of the clutch, the bolt 18 in the present clutch (1) sustains the shock of stopping the driven parts, (2) sustains the shock of rebound, (3) coacts with the bumpers to define accurately the stopped position of the driven parts, (4) locks the driving and driven parts against relative movement by extraneous forces and (5) acts as a cam follower to transmit the motion for relieving friction at the controlling detent. All of these functions are performed without increasing the number or combined mass of the driven parts as would otherwise be required were these functions to be performed without the use of the bolt.

The improved clutch has been found to be admirably adapted for high speed operation and control by sensitive instrumentalities as for example in high speed machine telegraphy wherein it is frequently desirable to control the starting and stopping of parts to be driven at high speeds and in definitely timed relations by means such as high speed electromagnets. Of special importance in this connection is the relieving of the frictional engagement between the cooperating control parts in advance of their relative movement in effecting engagement of the clutch. This feature, while especially adapted for use in connection with a clutch may obviously have other applications, and it should, therefore, be understood that in certain of the appended claims other possible applications are contemplated.

I claim as my invention:

1. A clutch combining rotatable driving and driven members, a connecting element slidably mounted on said driven member for endwise movement relative thereto and guided in such movement against movement circumferentially relative to the driven member, a control element mounted on said driven member for angular movement relative thereto and adapted in such angular movement to move said connecting element into and out of clutching engagement with said driving member, spring means normally tending to move said connecting element in a direction to engage said driving element, and a part supported against movement circumferentially with said driven member and constituting a movable stop adapted when disposed in the path of rotation of said control element to restrain the same against further rotation whereby to cause the element to move relative to the driven member in a direction to disengage said connecting element from said driving member.

2. A clutch comprising, in combination, a rotatable driving member having a shoulder movable in a circular path during the rotation of said member, a rotatable driven member, an element mounted on said driven member to engage and disengage said shoulder by movement in opposite directions transversely of the rotational axis of said driving member, a part mounted on said driven member for movement about an axis disposed within the circular path traversed by said shoulder, said part being connected to said element so as to move the same in a direction to disengage said shoulder, spring means normally tending to move said element in the opposite direction and means mounted on an external support and movable into the path of said part whereby to restrain movement of the same with the driven member and thereby disengage said element from said shoulder.

3. A positive drive clutch combining a rotatable driving member having a shoulder thereon, a rotatable driven member, a connecting element mounted on said driven member for rotation therewith and for movement relative thereto into and out of the path of said shoulder, a lever fulcrumed on said driven member and having a direct pivotal connection with said element, spring means normally tending to move said element and lever in a direction to engage the clutch, and a stop for restraining movement of said lever with the driven member thereby causing positive disengagement of said element from said shoulder.

4. A clutch comprising, in combination, rotatable driving and driven members, said driving member having a shoulder thereon, an element mounted on the driven member for rotation therewith and movement relative thereto into and out of the path of said shoulder, a lever mounted on the driven member to swing about the rotational axis thereof and arranged to move said element positively in a direction to disconnect said members, and a stop movable into and out of the path of said lever and adapted when in said path to restrain the lever against movement with the driven member and thereby cause the same to actuate said element in a direction to disconnect said members.

5. A clutch comprising, in combination, a constantly rotating driving disk having a peripheral shoulder thereon, a rotary member to be driven having an arm rigid therewith, a bolt guided in said arm for bodily sliding movement into and out of engagement with said shoulder, a finger pivotally mounted on said member for movement about the rotational axis thereof and connected to said bolt at a point eccentric with respect to said axis but closely adjacent thereto, a spring normally acting to move said bolt into the path of said shoulder whereby to establish driving relation between said disk and said member, and a nonrotatable detent movable into and out of the circular path traversed by said finger and operable when in said path to restrain the finger against movement whereby in the subsequent movement of the driven member to withdraw said bolt from engagement with said shoulder against the action of said spring.

6. A clutch comprising, in combination, rotatable driving and driven means, an element mounted on the driven member for movement relative thereto in one direction to establish a positive driving connection between said members and in the other direction to disconnect the members, a bell crank lever pivotally mounted on said driven member to swing about the rotational axis thereof, said lever having a short arm directly connected to said element, and a long arm projecting away from said axis, a stop adapted to move into and out of the path of said long arm and adapted when disposed in said path to block the lever against movement with the driven member and thereby move said element in a direction to disconnect said members, and spring means tending to move said element in a direction to establish the connection between said members.

7. A clutch combining rotatable driving and driven members, an element mounted on said driven member for movement relative thereto into and out of positive clutching engagement with said driving member to connect and disconnect said members, said element being held against circumferential movement relative to said driving member, and actuating means for said element comprising a part mounted on said driven member for limited circumferential movement relative thereto, said part remaining during such circumferential movement a fixed radial distance from the rotational axis of said driven member and being operatively associated with said element, and a radially movable stop by which said part may be restrained against rotation with said driven member whereby the continued movement of said driven member will cause said part to actuate said element in a direction to disengage the clutch.

8. A clutch combining rotatable driving and driven members, a pair of elongated elements carried by said driven member and extending in substantially radial directions, one of said elements being swingable about an axis coincident with the rotational axis of the driven member and operatively associated with the inner end of the other element, the latter being guided for bodily endwise movement and adapted when moved in opposite directions to engage and disengage said driving member, spring means tending to move the bodily movable element in a direction to cause engagement of the clutch, and means mounted on an external support and adapted for engagement with the outer end of said first mentioned element to restrain such element against movement with said driven member whereby to move said other element positively out of engagement with said driving member.

9. A clutch combining rotatable driving and driven members, a connecting element carried by said driven member and adapted for movement relative thereto into and out of clutching engagement with the driving member, an actuating element for said connecting element carried by said driven member and movable circumferentially relative thereto about the rotational axis thereof, and a non-rotatable stop arranged for blocking engagement with said actuating element at a plurality of annularly spaced points thereon, said stop acting to restrain the actuating element whereby to cause actuation of said connecting element.

10. A clutch combining rotatable driving and driven members, a connecting element carried by said driven member and adapted for movement relative thereto into and out of clutching engagement with the driving member, an actuating element for said connecting element carried by said driven member and movable relative thereto, and a non-rotatable stop arranged for blocking engagement with said actuating element at a plurality of points thereon spaced circumferentially around the actuating element at substantial distances from said axis, said stop when engaging the actuating element at one of said points acting to restrain the same against continued movement with said driven member whereby to disengage said connecting element from the driving member.

11. A clutch combining rotatable driving and driven members, an element mounted on said driven member for movement into and out of positive clutching engagement with said driving member, said element being held against circumferential movement relative to the driven member, a finger pivoted on said driven member to swing relative thereto about an axis coincident with the rotational axis of the driven member, means adapted to be moved into and out of the path of the outermost end portion of said finger and acting when in said path to block said finger against movement with the driven member and thereby produce relative circumferential movement between the finger and said member, and connecting means between said finger and element receiving such relative circumferential movement from said finger at a point close to its pivot and applying the same to said element in a direction to move the element out of clutching engagement with said driving member.

12. A clutch comprising, in combination, rotatable driving and driven members, an element mounted on the driven member for movement in one direction to connect said members and in another direction to disconnect the members, a lever pivotally mounted on said driven member to swing about the rotational axis thereof and connected to said element for actuating the same, a coiled torsion spring mounted concentric with the axis of the driven member and acting between the driven member and said lever to swing the latter in a direction to disengage said members, and a stop for movement into the path of the lever to restrain the same against movement with the driven member whereby to move said element against the action of said spring in a direction to disconnect said members.

13. In a clutch having rotatable driving and driven members, the combination of an element pivotally mounted on said driven member and adapted upon movement in opposite directions relative thereto to cause the clutch to be engaged and disengaged respectively, a detent fulcrumed on a relatively stationary support so that its end will swing into the path of said element and thereby block the latter against further movement with said drum member, the pivotal axis of said detent being so located that the force applied to the detent by said element will be directed along a line intersecting the axis, and an electromagnet controlling the position of said detent.

14. In a clutch having rotatable driving and driven members, the combination of a radially extending lever mounted on said driven member to swing relative thereto about the rotational axis thereof and controlling the engagement and disengagement of the clutch according to its angular position relative to the driven member, and a pivotal control detent mounted on a relatively stationary support for movement into and out of the path traversed by the outer end of said lever, said detent when disposed in the path of said lever receiving the impact from the lever as an endwise thrust which acts substantially through the pivotal axis of the detent.

15. A clutch combining a rotatable driving member in the form of a disk having a shoulder on its outer periphery which moves broadwise during the rotation of said member, a driven shaft, a substantially flat arm rigid at one end with said shaft and disposed in a plane perpendicular to said shaft a lateral projection at the outer end of said arm overlying the path traversed by said shoulder, a bolt extending in a substantially radial direction and having a flat outer end guided in the overlying portion of said projection and adapted to move into and out of the path of said shoulder upon endwise movement of the bolt in opposite directions, and means associated with the inner end of said bolt to actuate the same.

16. A clutch combining a rotatable driving member having a peripheral shoulder which moves broadwise during the rotation of said member, a driven shaft, a hub of substantial axial length splined on said shaft, an outwardly projecting arm formed integral with said hub, a bolt guided in the outer end portion of said arm for movement into and out of the path of said shoulder, and means for actuating said bolt including an element pivotally supported to swing about the axis of said shaft and disposed on the side of said arm opposite said hub.

17. A clutch combining a driving disk having a peripheral shoulder, a rotatable driven member, an L-shaped bolt having a shank disposed in radial position and an arm overlying the path traversed by said shoulder, an arm rigid with said driven shaft and disposed between said disk and said shank, a lateral projection on said second arm disposed externally of and adjacent to the path of said shoulder and providing a guideway for said bolt arm, and means having an operative connection with the inner end portion of said shank for actuating said bolt.

18. A clutch combining a driving member having a peripheral shoulder, a rotatable driven member, an elongated bolt having a shank disposed in a substantially radial position, and an arm for engaging said shoulder projecting laterally from said shank, an arm rigid with said driven member, a lateral projection at the outer end of said arm overlying said disk at a point adjacent the path of said shoulder, said projection providing a guideway for said bolt arm, and means associated with the inner end portion of said shank for actuating the bolt to effect engagement and disengagement of the clutch, said last mentioned means supporting said inner end portion against lateral displacement under the impact resulting from the engagement of said shoulder and said bolt arm.

19. A clutch combining a rotatable driving member having a shoulder, a rotatable driven member, a radial arm rigid with said shaft and having a lateral projection at its outer end disposed adjacent said shoulder and overlying the plane of rotation thereof, a non-rotatable abutment disposed adjacent the path of rotation of said projection on the side thereof opposite the path traversed by said shoulder, a substantially flat element having its intermediate portion guided in said projection for movement in a substantially radial direction, said element upon movement in one direction disengaging said shoulder and becoming positioned for engagement with said abutment, said element upon movement in the opposite direction disengaging said abutment and becoming positioned for engagement with said shoulder, the shock of starting and stopping said driven shaft being applied to said arm through the medium of said element, and means for actuating said element to control the engagement and disengagement of the clutch.

20. A clutch combining a rotatable driving member having a shoulder thereon, a driven member, a connecting element comprising an elongated bolt mounted on said driven member for rotation therewith and for endwise movement transversely of the clutch axis, said bolt being movable in one direction into the path traversed by said shoulder and in the opposite direction out of said path, means for moving the bolt out of engagement with said shoulder to disengage the clutch, and a stationary abutment engageable by said bolt only as an incident to such movement of the latter out of engagement with the shoulder.

21. A clutch combining a rotatable driving member having a shoulder thereon, a driven member, a connecting element comprising an elongated bolt mounted on said driven member for rotation therewith and for endwise movement in one direction into the path traversed by said shoulder and in the opposite direction to disengage said shoulder, means rigid with said driven member for guiding said bolt closely adjacent its point of engagement with said shoulder, an abutment disposed in the path of said element when the latter is disengaged from said shoulder and adapted to act thereon at a point adjacent said guide means to arrest the motion of the driven member in a predetermined angular position, and a latch also acting on said element adjacent said point when disengaged from said shoulder to limit the reverse movement of said driven member away from said abutment.

22. In a clutch having rotatable driving and driven members, the combination of a connecting element mounted on said driven member and movable in opposite directions relative to the driven member to effect engagement and disengagement of the clutch, said element and driven member being held against relative circumferential movement, and a plurality of relatively stationary abutments spaced substantial distances from the clutch axis and arranged in annularly spaced relation about the path traversed by said element and each positioned in the path of said element when the latter is in clutch-disengaged position thereby enabling the driven member to be stopped in a plurality of different angular positions depending upon the point in its revolution when the clutch is disengaged.

23. The combination with a clutch having rotatable driving and driven members and means controlling the connection and disconnection of said members, of a stationary abutment for arresting the motion of said driven member, an element mounted on said driven member for movement relative thereto and normally engaging said bumper when the clutch is disengaged, and spring means acting automatically as an incident to engagement of the clutch to disengage said element from said abutment.

24. In a clutch having rotatable driving and driven members, the combination of means providing a stationary abutment, an element carried by and held against circumferential movement relative to said driven member but movable relative thereto into and out of a position to engage said abutment, and means deriving energy from the motion of the driven member while connected to the driving member and operating to apply such energy to said element to move the same in a position to engage said abutment whereby the latter acts to arrest the motion of said driven member.

25. In a clutch having rotatable driving and driven members, means for arresting the motion of said driven member in a predetermined position upon disengagement of the members including an element mounted on said driven member for movement relative thereto in opposite directions automatically as incidents to the engagement and disengagement of the clutch, a yieldable abutment mounted on a relatively stationary support and disposed in a position to be struck by said element when the clutch is disengaged, and a latch mounted on said support and adapted to move in behind said element upon the engagement thereof with said abutment.

26. In a clutch having a rotatable driven member, two non-rotatable abutments arranged in opposing relation, a part on said member engageable with said abutments after disengagement of the clutch and acting to hold said member against movement in either direction, and a single coiled spring for cushioning the stopping of said driven member by one of said abutments and the shock of rebound against the other abutment, the shock of stopping being applied to one end of said spring and that of rebounding being applied to the other end.

27. In a rotary clutch, means for arresting the motion of the driven clutch member comprising two bars arranged in end-to-end relation and guided for endwise movement, the adjacent ends of said bars constituting abutments for engaging a part on said driven member upon disengagement of the clutch, and a contractile spring stretched between said bars and adapted to be extended in one direction in absorbing the shock of stopping said driven member and in the other direction in sustaining the rebound of said driven member.

28. In a rotary clutch, means for arresting the motion of the driven clutch member comprising a stopping bumper mounted for limited movement in the direction of rotation of the clutch and positioned to be struck by a part in the driven member after disengagement of the clutch, a rebound bumper mounted opposite said stopping bumper for limited movement in a direction reverse from that of the clutch, said rebound bumper also being movable out of the path of said part as the latter approaches said stopping bumper, and a single spring for urging said bumpers toward each other and said rebound bumper toward the path traversed by said part.

29. A clutch combining rotatable driving and driven members, a pair of opposing radially disposed shoulders on said driving member defining a peripheral notch therein, an elongated bolt for connecting said members mounted on said driven member for bodily endwise movement in opposite directions into and out of said notch, said bolt when in said notch receiving a driving force from the trailing one of said shoulders whereby the members rotate in unison, said other shoulder acting on said element during such rotation to prevent the driven member from running ahead of the driving member, means for actuating said bolt to engage and disengage said clutch, and stationary cam means positioned to cooperate with said element during a part of the initial revolution of the driven member and acting during such cooperation to urge said element into said notch.

30. A clutch combining a rotatable driving member having a broadwise movable shoulder, a rotatable driven member, an elongated connecting element mounted on said member for bodily movement into and out of the path of said shoulder, means controlling the movement of said element, and a stationary cam cooperating with said element to prevent said element from running ahead of said shoulder upon the initial movement of the driven member following engagement of the clutch.

31. A clutch combining a driving member having a peripheral recess defined by a radially disposed trailing shoulder and a radially disposed leading shoulder facing said trailing shoulder and having a radial width substantially less than that of the trailing shoulder, a bolt for connecting said members mounted on said driven member for bodily endwise movement in a direction transversely of the clutch axis, said bolt having a portion adapted to enter said recess with a sliding fit, spring means normally tending to move said bolt in a direction to carry said part into the path of said trailing shoulder, said narrow leading shoulder facilitating such entry of the bolt and acting when the clutch is engaged to prevent said driven member from running ahead of the driving member, and means for withdrawing said bolt.

32. In a clutch for establishing driving relation between rotatable driving and driven members, the combination of two parts adapted when brought into engagement to interrupt the rotation of said driven member, and means operating while said driven member is thus at rest to relieve the engaging pressure between said parts so that the parts may be disengaged and driving relation between said members reestablished without overcoming the friction resulting from such engagement.

33. In combination with a clutch for establishing driving relation between a drive shaft and a driven shaft, a spring normally acting to establish such driving relation, a part rotatable with said driven shaft, a stop adapted when in blocking position relative to said part to be engaged by the part and thereby cause the motion of said driven shaft to be interrupted, and means operating intermittently while said stop is in blocking position to relieve the engaging pressure of said part thereon and enable said stop to be withdrawn from blocking position without overcoming the friction resulting from such engagement.

34. In a clutch, mechanism controlling the engagement and disengagement of the clutch including an element rotatable with the driven member of the clutch but arranged for limited movement relative to the driven member to control the engagement and disengagement of the clutch, a non-rotatable element adapted for engagement with said first mentioned element to cause disengagement of the clutch, and means acting automatically while the clutch is thus disengaged to move said first mentioned element relative to the driven member in a direction to relieve the engaging pressure between said elements.

35. In a clutch, the combination of an element carried by the driven clutch member and movable relative thereto to control the engagement and disengagement of the clutch, a part movably mounted on an external support and engageable with said element to effect disengagement of the clutch with the driving and driven clutch members in a predetermined angular relation, means operating when said clutch members are in a predetermined different angular relation to retract said element out of engagement with said part but permitting movement of the element back into contact with the part when said driving and driven members are again brought into said first mentioned angular relation, and means acting to hold said driven member against angular movement while said element is retracted.

36. A clutch combining a rotary driving member having a plurality of annularly spaced and radially disposed shoulders, a rotatable driven member, a bolt mounted on said driven member for bodily endwise movement in a substantially radial direction, said bolt upon movement in one direction being carried into the path of said shoulders, a lever fulcrumed on said driven member and operatively associated with the inner end of said bolt, a stop mounted on a relatively stationary support for movement into and out of the path of said lever, said stop when in said path being engaged by the lever thereby restraining the same against continued movement whereby to withdraw said bolt from engagement with one of said shoulders, and a plurality of circumferentially extending cam surfaces formed on said driving member between the adjacent shoulders and each acting on said bolt to retract said lever from engagement with said stop.

37. A clutch combining rotatable driving and driven members, a connecting member rotatable with said driven member and movable relative thereto into and out of clutching engagement with said driving member, two control elements, one mounted to rotate with said driven member and operatively associated with said connecting member but movable relative thereto, the other element being movable into and out of the path of the first element so that the continued movement of the driven parts, after engagement of said elements, disengages said connecting member from said driving member, and cam means rigid with said driving member and acting on said connecting member periodically while the clutch remains disengaged to move such member and said first mentioned element in a direction to reduce the pressure of engagement between said elements.

38. In a rotary clutch having driving and driven members, the combination of an element controlling the engagement and disengagement of the clutch, said element being mounted on said driven member for rotation therewith and for movement relative thereto, movable stop means adapted when positioned in the path of said element to cause the element to move in a direction to disengage the clutch, a cam movable in timed relation to said driven member, and a follower for said cam rotatable with and movable relative to said driven member and operatively connected to said element, said cam acting through the medium of said follower to retract said element periodically out of contact with said stop means.

39. In a clutch, the combination of an element carried by the driven clutch member and movable relative thereto to control the engagement and disengagement of the clutch, a plurality of non-rotatable stops mounted in an external support for independent movement into and out of the path traversed by said element, each of said stops when disposed in said path acting to restrain said element against continued movement with the driven member whereby to cause disengagement of the clutch with the driven member in a predetermined position, and means acting periodically while the clutch is held disengaged by the blocking action of one of said stops to retract said element away from the active stop whereby to facilitate the movement of another of said stops into blocking position.

40. In a positively acting clutch, the combination of an element mounted on the driven clutch member for rotation therewith and movement relative thereto in opposite directions to cause engagement and disengagement of the clutch, a non-rotatable element adapted for engagement with said first mentioned element to restrain the same against movement with the driven clutch member whereby to cause disengagement of the clutch, and means acting automatically while the clutch is thus disengaged to relieve the engaging pressure between said elements periodically and in timed relation to the movement of the driving clutch member.

41. A clutch comprising a rotary driving member having a radially disposed shoulder, a rotatable driven member, a connecting element movably mounted on said driven member and spring-pressed into the path of said shoulder, a lever fulcrumed on said driven member and connected to said element, a stop movable into the path of said lever in the rotation thereof to withdraw said element from said shoulder, a peripheral cam on said driving member acting on said element to retract said lever from said stop after the shoulder passes the disengaged element, and means operable while said lever is retracted from said stop to hold said driven member against angular movement.

42. In a clutch having rotatable driving and driven members, the combination of an element movably mounted on said driven member and spring-pressed in a direction to connect said members, a part movable into the path traversed by said element and operable in the subsequent movement of the driven member to move said element in a direction to disconnect said members, means operating periodically while said members are thus disconnected to relieve the pressure between said element and said part, and means acting while said pressure is relieved to hold said driven member against movement in either direction.

43. In a clutch having driving and driven members, mechanism for disengageably connecting said members including a bolt mounted on the driven member for movement transversely of the axis thereof and adapted when moved in one direction to establish a driving relation between said members and when moved in the opposite direction to interrupt said driving relation, a stationary abutment, and a part on said bolt movable into engagement with said abutment only as an incident to the movement of the bolt into a position to interrupt said driving relation.

44. In a clutch having driving and driven members, mechanism for disengageably connecting said members, including an element mounted on one of said members and movable in one direction to establish a driving relation between said members and in the opposite direction to interrupt such relation, a stationary abutment, and a part movable into engagement with said abutment only as an incident to the movement of the element into a position such as to interrupt said driving relation.

45. In a clutch or the like the combination of two parts arranged for interengagement, one of said parts being movable relative to the other to initiate a predetermined operation, and means acting to relieve the engagement between said parts while maintained in operative relationship so as to facilitate such relative movement.

46. The combination of two parts arranged for engagement and movable relative to each other to initiate a given operation, means tending to hold said parts in a predetermined operative relation with portions thereof in frictional contact, and means operative to relieve the frictional engagement between the parts while maintained in such predetermined relation whereby to facilitate relative movement between the parts.

47. The combination of two parts arranged for interengagement and movable relation to each other to initiate a given operation, means tending to hold said parts in a predetermined operative relation with portions thereof in frictional contact, electromagnetically controlled means operative upon one of the parts to move it relative to the other at a predetermined time, and means acting in advance of such relative movement to relieve the frictional contact between the parts.

HOWARD D. COLMAN.